June 30, 1959     W. DOBLE     2,892,646

IMPELLER-SHAFT CONNECTION

Filed July 26, 1954

INVENTOR.
WARREN DOBLE
BY HIS ATTORNEYS.
HARRIS, KIECH, FOSTER & HARRIS under# United States Patent Office 2,892,646
Patented June 30, 1959

2,892,646
IMPELLER-SHAFT CONNECTION

Warren Doble, North Hollywood, Calif., assignor to Jabsco Pump Company, Burbank, Calif., a corporation of California Application July 26, 1954, Serial No. 445,837

3 Claims. (Cl. 287—53)

The present invention relates in general to means for mounting a rotor on a shaft in torque-transmitting relation therewith and will be considered in connection with mounting a rubber pump impeller on a shaft as a matter of convenience since it is particularly applicable thereto. As used herein, the term "rubber" is intended to include not only natural rubber, but any material, such as the so-called "synthetic rubbers," having physical characteristics or properties similar to those of natural rubber, particularly as to flexibility and resilience.

A primary object of the invention is to provide a shaft having at least three circumferentially spaced, concave recesses therein and to provide a member on the shaft having circumferentially spaced, inwardly extending protuberances respectively disposed in such recesses. With this construction, when the shaft is rotated, the protuberances engage the sides of the recesses in transmitting torque from the shaft to the member thereon with the result that the axis of rotation of the member on the shaft is caused to coincide with the axis of rotation of the shaft by a camming action between the recesses and the protuberances, which is an important feature of the invention.

Another object of the invention is to provide a rubber pump impeller molded on a sheet metal tube having inwardly struck dimples disposed in the concave recesses in the shaft, thereby providing a very simple means of mounting the impeller on the shaft while insuring coincidence of the axes of rotation of the impeller and the shaft, which minimizes wear in the torque-transmitting connection between the shaft and the impeller.

The foregoing objects, advantages and features of the present invention, together with various objects, advantages and features thereof which will become apparent, may be attained with the exemplary embodiment of the invention illustrated in the accompanying drawing and described in detail hereinafter. Referring to the drawing.

Figure 1:
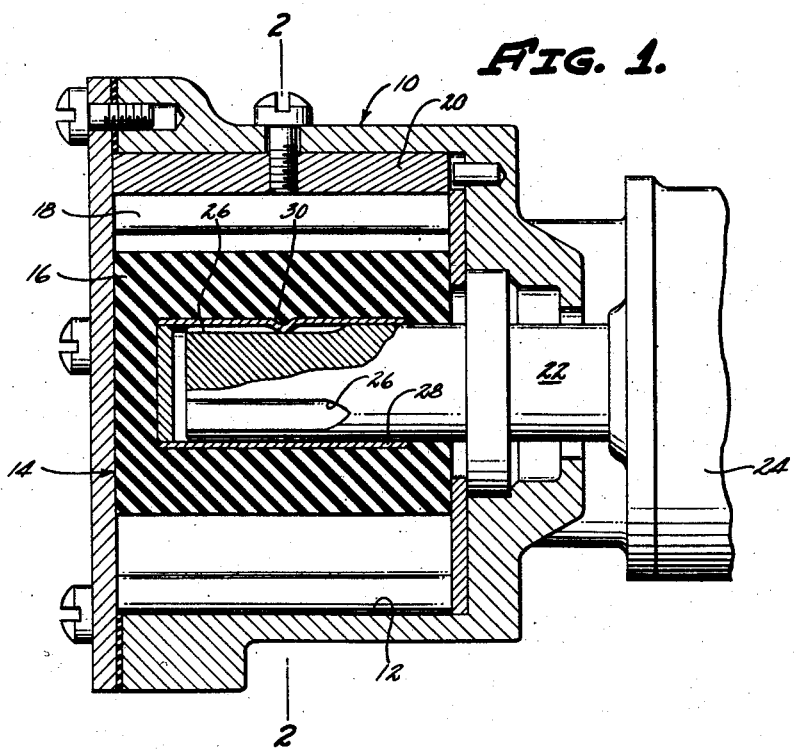
Fig. 1 is a longitudinal sectional view of a pump embodying the invention.

Referring to the drawing, the numeral 10 designates a pump housing providing a chamber 12 for a rubber impeller 14 having a hub 16 and radial vanes 18 adapted to be flexed in the usual manner by a cam 20. Extending into the chamber 12 is a shaft 22 driven by any suitable means, indicated at 24.

Figure 2:
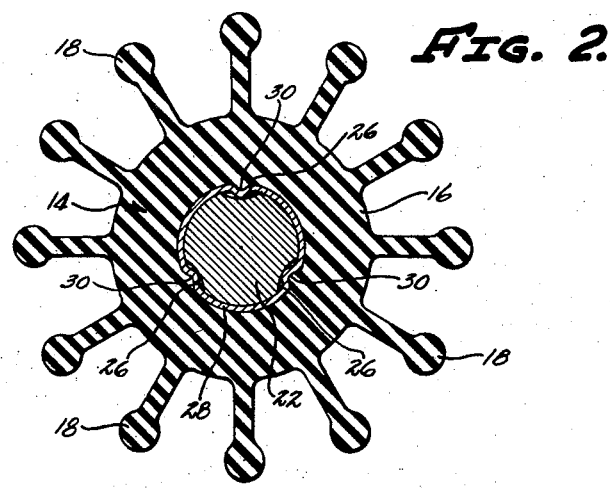
Fig. 2 is a transverse sectional view of the pump taken along the broken line 2—2 of Fig. 1.

The shaft 22 is provided adjacent its outer end with at least three circumferentially spaced, concave recesses 26, which are shown as longitudinal grooves. The concave grooves 26 are preferably curved in a plane transversely of the shaft 22, as best shown in Fig. 2, although they may be V-shaped, or otherwise shaped, in some instances. The impeller 14 is molded on a sheet metal tube 28 having inwardly struck dimples 30 disposed in the respective grooves 26, the impeller being bonded to the tube 28.

With this construction, when the shaft is rotated to rotate the impeller 14, the sides of the grooves 26 engage the dimples 30 and cam the impeller into a position such that its axis of rotation coincides with the axis of rotation of the shaft, thereby minimizing wear, which is an important feature of the invention.

Although I have disclosed an exemplary embodiment of my invention for purposes of illustration, it will be understood that various changes, modifications and substitutions may be incorporated in such embodiment without departing from the spirit of the invention as defined by the claims hereinafter appearing.

I claim as my invention:

1. In combination: a rigid shaft having at one end a substantially cylindrical section of constant external diameter longitudinally of said section, the exterior of said section having therein a plurality of circumferentially spaced, uniformly outwardly divergent, concave recesses which extend longitudinally of said section from said one end of said shaft and which include portions of constant depth extending longitudinally of said section from said one end of said shaft; and a rigid member telescoped over and slidable longitudinally of said section toward and away from said one end of said shaft and having internally thereof a plurality of circumferentially spaced, uniformly inwardly convergent, inwardly extending, convex protuberances respectively extending into and respectively engageable with the bottoms of said portions of said recesses, said protuberances being circumferentially narrower than said portions of said recesses and thus being out of engagement with the sides of said portions when they are in engagement with the bottoms thereof.

2. A combination according to claim 1 wherein said recesses are circularly arcuate in a plane extending transversely of said portion of said shaft.

3. A combination as set forth in claim 2 wherein the included angle between the sides of each of said protuberances is less than the included angle between the sides of each of said recesses.

References Cited in the file of this patent

UNITED STATES PATENTS

| | | |
|---|---|---|
| 784,032 | Burke | Mar. 7, 1905 |
| 1,291,388 | Bright | Jan. 14, 1919 |
| 1,424,211 | Pugh | Aug. 1, 1922 |
| 1,493,199 | Havens | May 6, 1924 |
| 2,118,913 | Bachman | May 31, 1938 |
| 2,189,356 | Briggs | Feb. 6, 1940 |
| 2,199,926 | Swennes | May 7, 1940 |
| 2,466,440 | Kiekhaefer | Apr. 5, 1949 |
| 2,644,402 | Lehman | July 7, 1953 |

FOREIGN PATENTS

| | | |
|---|---|---|
| 375,231 | Great Britain | June 23, 1932 |